(12) United States Patent
Stolpman

(10) Patent No.: US 10,174,611 B2
(45) Date of Patent: Jan. 8, 2019

(54) MUD PULSE TELEMETRY SYSTEMS AND METHODS USING RECEIVE ARRAY PROCESSING

(71) Applicant: HALLIBURTON ENERGY SERVICES, INC., Houston, TX (US)

(72) Inventor: Victor J. Stolpman, The Woodlands, TX (US)

(73) Assignee: Halliburton Energy Services, Inc., Houston, TX (US)

(*) Notice: Subject to any disclaimer, the term of this patent is extended or adjusted under 35 U.S.C. 154(b) by 418 days.

(21) Appl. No.: 14/422,319

(22) PCT Filed: Aug. 16, 2013

(86) PCT No.: PCT/US2013/055473
§ 371 (c)(1),
(2) Date: Feb. 18, 2015

(87) PCT Pub. No.: WO2014/031499
PCT Pub. Date: Feb. 27, 2014

(65) Prior Publication Data
US 2015/0226058 A1    Aug. 13, 2015

Related U.S. Application Data

(60) Provisional application No. 61/684,731, filed on Aug. 18, 2012.

(51) Int. Cl.
*G01V 1/40* (2006.01)
*G01V 3/18* (2006.01)
(Continued)

(52) U.S. Cl.
CPC ............ *E21B 47/182* (2013.01); *E21B 47/18* (2013.01); *H04L 27/10* (2013.01); *H04L 27/18* (2013.01)

(58) Field of Classification Search
CPC ........ E21B 47/18; E21B 47/182; E21B 47/01; E21B 49/006; E21B 10/42; E21B 47/122;
(Continued)

(56) References Cited

U.S. PATENT DOCUMENTS 7,123,580 B2  10/2006  Tang et al.
7,222,284 B2   5/2007  Stolpman
(Continued)

FOREIGN PATENT DOCUMENTS

WO    2014/031499    2/2014

OTHER PUBLICATIONS

PCT International Preliminary Report on Patentability, dated Apr. 28, 2014, Appl No. PCT/US2013/055473, "Mud Pulse Telemetry Systems and Methods Using Receive Array Processing," filed Aug. 16, 2013, 8 pgs.
(Continued)

*Primary Examiner* — An H Do
(74) *Attorney, Agent, or Firm* — Alan Bryson; Parker Justiss, P.C.

(57) ABSTRACT

Mud pulse telemetry systems and methods may employ a downhole pulser to encode a digital telemetry data stream as pressure fluctuations in a fluid flow stream. An arrangement of spatially separated sensors acquire pressure-responsive measurements at multiple positions within the plumbing of a drill rig. A receiver collects and digitizes the measurements from the spatially separated sensors and subjects them to a principal components analysis (PCA) to determine those one or more basis vectors associated the telemetry signal. The PCA process may employ decomposition of a spatial correlation/covariance matrix or a temporal-spatial correlation/covariance tensor. The selected basis vector(s) are then used to obtain the telemetry signal for demodulation into the telemetry data stream.

20 Claims, 3 Drawing Sheets

(51) Int. Cl.
  *G01V 5/04*   (2006.01)
  *G01V 9/00*   (2006.01)
  *E21B 47/18*  (2012.01)
  *H04L 27/10*  (2006.01)
  *H04L 27/18*  (2006.01)

(58) Field of Classification Search
  CPC ......... H04L 27/18; H04L 27/10; G01V 1/005;
                              G01V 1/37; G01V 1/00
  USPC .................................................. 702/2, 6, 9
  See application file for complete search history.

(56) References Cited

U.S. PATENT DOCUMENTS

| | | | |
|---|---|---|---|
| 7,385,915 B2 | 6/2008 | Stolpman et al. | |
| 7,453,966 B2 | 11/2008 | Tang et al. | |
| 7,458,010 B2 | 11/2008 | Stolpman | |
| 7,619,964 B2 | 11/2009 | Son et al. | |
| 7,664,008 B2 | 2/2010 | Stolpman et al. | |
| 7,684,753 B2 | 3/2010 | Ionescu et al. | |
| 7,689,892 B2 | 3/2010 | Stolpman | |
| 7,746,758 B2 | 6/2010 | Stolpman | |
| 7,757,150 B2 | 7/2010 | Stolpman | |
| 7,782,895 B2 | 8/2010 | Pasanen et al. | |
| 7,813,458 B2 | 10/2010 | Van Waes et al. | |
| 7,934,146 B2 | 4/2011 | Stolpman | |
| 8,485,277 B2 * | 7/2013 | Hulden | E21B 47/12 175/26 |
| 2009/0231955 A1 | 9/2009 | Barnes | |
| 2010/0299070 A1 | 11/2010 | Abma | |
| 2012/0024600 A1 | 2/2012 | Bittar et al. | |

OTHER PUBLICATIONS

PCT International Search Report and Written Opinion, dated Nov. 7, 2013, Appl No. PCT/US2013/055473, "Mud Pulse Telemetry Systems and Methods Using Receive Array Processing," filed Aug. 16, 2013, 11 pgs.

* cited by examiner

FIG. 2A POSITIVE PULSER (STATOR & ROTOR)
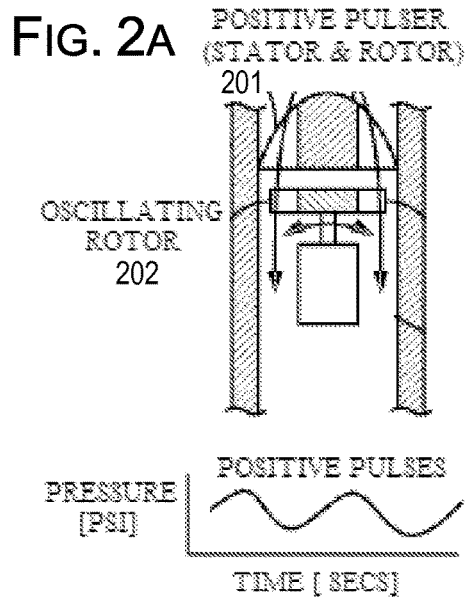
FIG. 2B SIREN POSITIVE PULSER (ROTOR & STATOR)
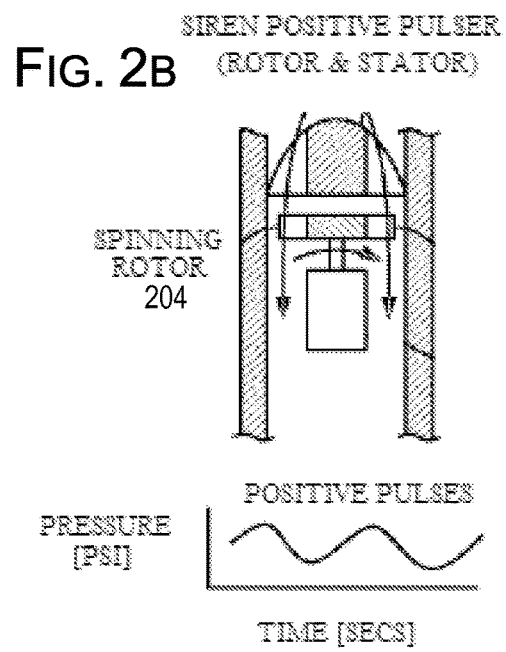
FIG. 2C POSITIVE PULSER (POPPET & ORIFICE)
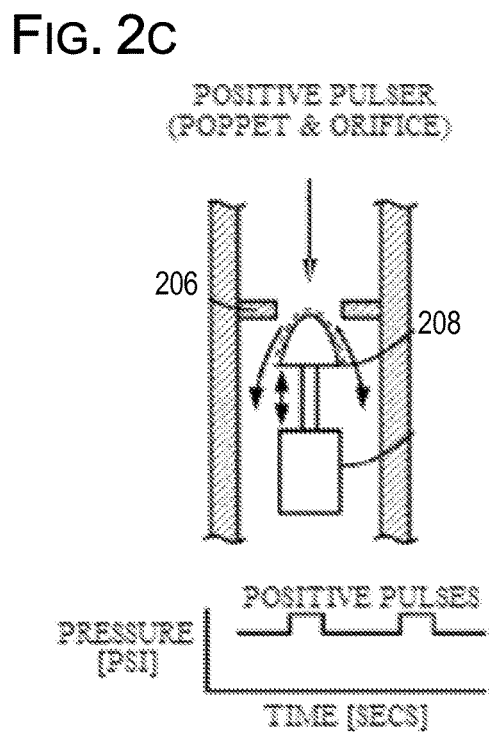
FIG. 2D NEGATIVE PULSER (GATE & SEAT)
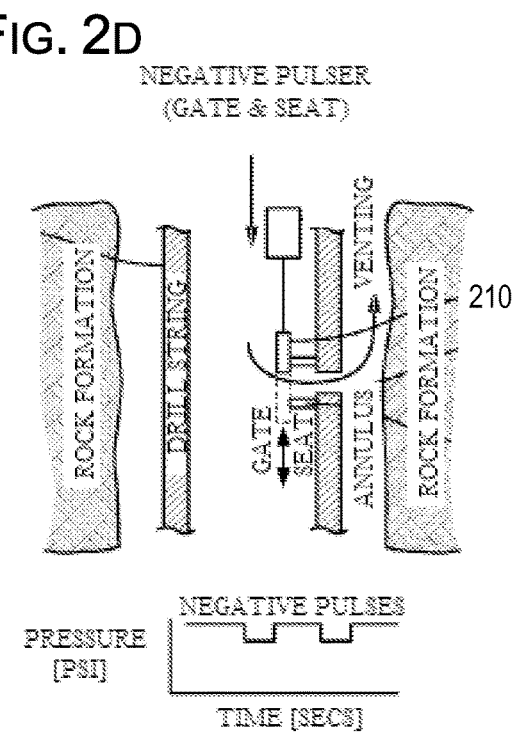

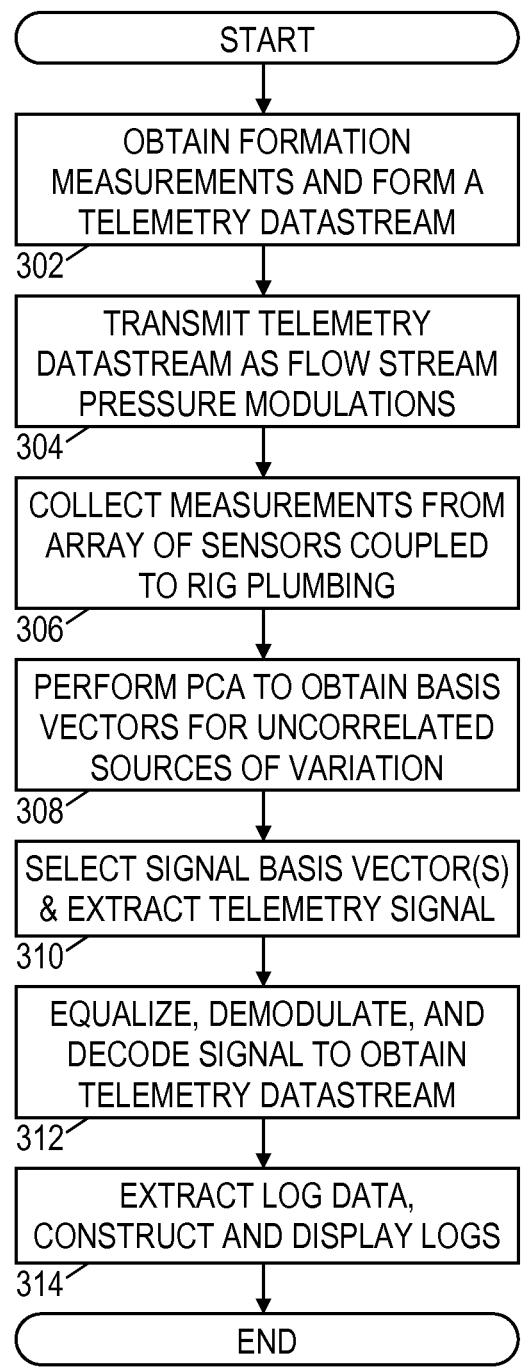

MUD PULSE TELEMETRY SYSTEMS AND METHODS USING RECEIVE ARRAY PROCESSING

CROSS-REFERENCE TO RELATED APPLICATIONS

This application claims priority to Provisional U.S. Application Ser. No. 61/684,731, titled "Mud Pulse Telemetry Systems and Methods Using Receive Array Processing" and filed Aug. 18, 2012 by Victor J. Stolpman, which is hereby incorporated herein by reference.

BACKGROUND

In the exploration of oil and gas, hydrocarbon seeking entities often employ Measurement While Drilling/Logging While Drilling (MWD/LWD) services to measure and collect drilling and/or formation information in real time while drilling (as the name suggests). In their quest, these entities seek out drilling service companies that specialize in such services as directional drilling, formation evaluation, and other oil-well drilling/planning operations. These services companies will then bring various electronic "down-hole tools" to a well site and insert them into the drill string near the drilling bit to sense drilling or rock properties, acquire, process, transmit and present the real-time information as the well is being drilled.

In addition to providing MWD/LWD measurements, the downhole tools facilitate directional drilling. Directional drilling employs a surveying instrument that estimates the orientation and optionally the position of the bit. The surveying instrument is coupled with a steering mechanism that enables the driller to navigate the borehole relative to subsurface regions of interest.

The assembled downhole tools are often collectively referred to as the Bottom-Hole-Assembly (BHA) that includes a telemetry module for communicating with the surface. The BHA transmits a representation of a least a subset of the measured/logged data to the surface, where it is processed and presented to a user as a log report. Often, this data is of a digital format and may subject to a variety of compression techniques. There are a variety of transmission methods including but not limited to mud pulse telemetry, electro-magnetic telemetry, acoustic telemetry and wired-pipe telemetry. Of these, mud pulse telemetry has proven most popular due to its reliability.

Mud pulse telemetry (MPT) exploits the drilling rig's plumbing system. In most drilling operations, a circulation pump circulates fluid through a drill string and out the drill bit into a borehole, where it returns along the annulus to the surface. This fluid (often called "mud" in the oilfield industry) may include water and/or oil and one of a plurality of additional additives that may be inert or chemically reactive with other molecular compositions present within a borehole during drilling operations. There are a multitude of motivations for pumping mud with one example being simply to remove earth materials from the borehole.

A service company may install at least one transducer/sensor within the rig's plumbing system. The surface rig's plumbing system mechanically connects the so-called mud-pump(s) with the drill-string which in turns couples with a drill-bit within the borehole. The purpose of these surface transducers/sensors is to enable the acquisition of encoded waveforms transmitted from a "pulser" down in the BHA. Thus, MPT systems serve to communicate real-time information through a mud column within a drill string via a series of modulated pressure waves that are supposed to be detected by the surface transducers/sensors.

Unfortunately, signal energy dispersion in the fluid and noise sources (e.g., from the circulation pump) often hinder the operation of the MPT system. Various precautions may be employed such as usage of pump dampeners (a.k.a. "de-surgers"), careful positioning of the transducer, and directional detection. Such precautions are usually helpful, yet there remain opportunities to further enhance telemetry system performance.

BRIEF DESCRIPTION OF THE DRAWINGS

Accordingly, there are disclosed in the drawings and detailed description specific embodiments of mud pulse telemetry methods and systems that employ receive array processing. In the drawings:

FIG. 2 shows various forms of positive and negative pulsers.

FIG. 3 is a flow diagram of an illustrative MPT method employing receive array processing.

Figure 1:
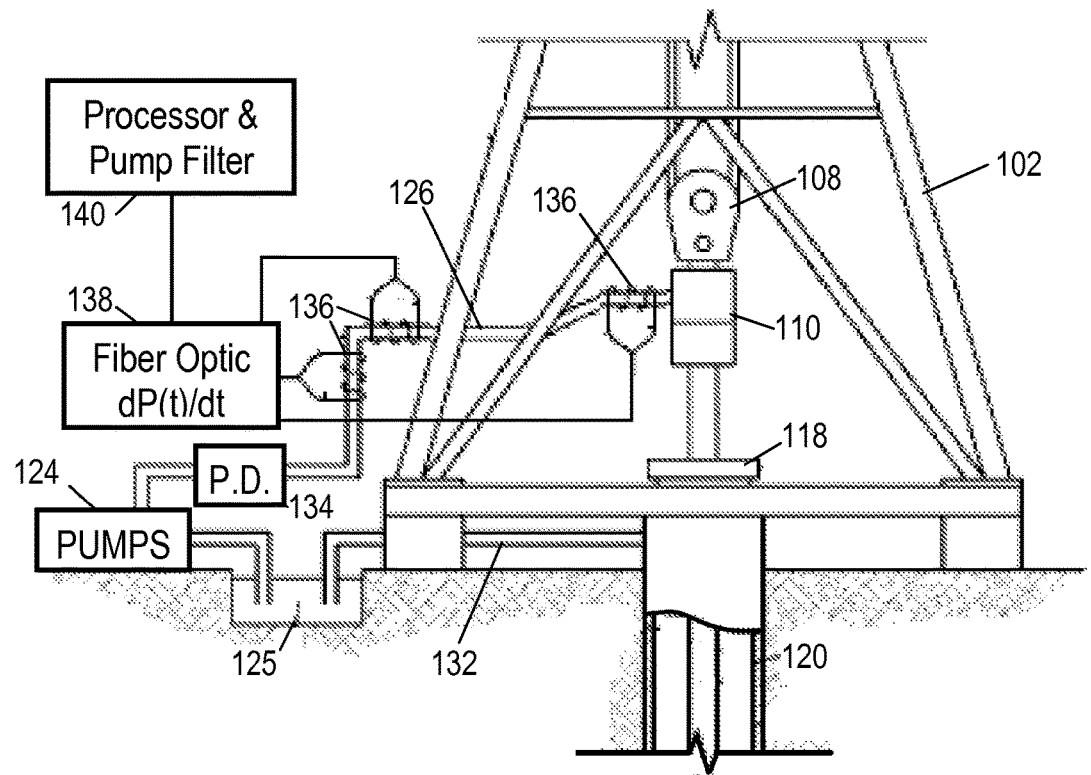
FIG. 1 shows an illustrative measurement-while-drilling (MWD) environment suitable for the disclosed systems and methods.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

Terminology

In the present application, the following acronyms may be employed. They are spelled out here for easy reference:
AR Auto Regressive
ED Eigenvalue Decomposition
MA Moving Average
PCA Principal Component Analysis
SVD Singular Value Decomposition

DETAILED DESCRIPTION

The following description relates to a variety of mud pulse telemetry (MPT) method, apparatus and system embodiments that enable Measurement While Drilling (MWD) services with real-time data transfer from sensors near the bit within a borehole to a surface location. Although not limited to surface systems, this disclosure does focus most of the discussion on the receiver side configurations, but this does not imply that this disclosure is limited to surface systems. One skilled in the art will recognize non-surface system embodiments (e.g., downlink telemetry systems) are readily derivable from the ensuing description.

In short, this disclosure describes MPT systems and methods that employ array processing techniques such as Principal Component Analysis (PCA) to a plurality of digitized measurements from a plurality of transducers (sensors) spatially separated along a drilling rig's plumbing. Singular Value Decomposition (SVD) and Eigenvalue Decomposition (ED) are examples of ways to extract principal components that exploit 2nd order statistical similarities/differences (e.g. spatial and/or temporal correlations) between said digitized measurements of a physical phenomenon (e.g. pressure, velocity, acceleration, shear, temperature, phase changes, and wall strain).

The sensors each provide a signal with an associated output signal range that defines the limits on a corresponding axis in a "signal space". The set of sensor measurements when taken together form coordinates of a point in the signal space. The full collection of sensor measurement sets defines a subspace within the signal space. This subspace can be expressed in a number of ways, but a particularly useful representation is the set of principal components, which can be loosely expressed as being the set of orthogonal directions that best align with the subspace, in decreasing order of signal variance. Signal decomposition methods such as ED and SVD attempt to identify these principal components in the form of orthonormal basis vectors (pairwise orthogonal vectors with unit norm length). The unit norm definition may vary. A common norm definition is Euclidean norm, i.e. l2-norm. Other common norms may be the l1-norm and (for discrete measurements) the l∞-norm. Embodiments using SVD and ED for PCA processing will likely use the Euclidean norm.

When ordered in rank of importance, the principal components attempt to capture the most variance possible within the signal subspace observed in said plurality of digitized measurements. When using SVD, this form of signal decomposition may sort the discovered basis vectors in descending order of "interest" using at least in part the magnitude of each basis direction's corresponding singular value. Some embodiments may want to reduce receiver complexity and choose to utilize a reduced set of features for detection purposes rather than process the entire set of observed digital measurements. These embodiments may discard and/or ignore the components contributing only a minor portion of information. These so-called "minor-components" may correspond to basis components related to singular value magnitudes below some predetermined threshold (e.g. small absolute aggregate value or a percentage of sum of all singular values).

Some method embodiments may further account for temporal components of the measurements with spatial-temporal tensor(s) to extract directions relevant to both space and time simultaneously. This extraction is done by raking across time and space to construct 1st and 2nd order statistics to serve as the basis for PCA.

FIG. 1 depicts an illustrative Mud Pulse Telemetry (MPT) apparatus embodiment and system embodiment in use at a typical drilling installation while operating a Measurement While Drilling (MWD) service. As illustrated, the typical drilling installation includes a drilling derrick 102 at the surface of the well. The derrick may be transportable and temporarily erected on location. The drilling derrick 102 supports the drill string 104 and BHA 106 via a hoist 108 and swivel 110. In the FIG. 1 example, the BHA 106 includes a pulser 112, a tool sensor 114, and a drill bit 116. The BHA may further include additional MWD tools, stabilizers, and/or drill collars or heavyweight drill pipe (HWDP) to stiffen the BHA and add additional weight to aid with keeping the drill bit "on-bottom".

The hoist 108 lowers drill string 104 through the rotary table 118 into the casing 120 and beyond into the open borehole 122 until the bit 116 reaches the bottom. The rotary table 118 turns the drill string 104 and bit 116 to extend the borehole through earth formations. If desired, a downhole mud motor can be employed to rotate the bit at a different rate than the drill string.

Circulation pumps 124 take drilling fluid ("mud") from a retention pit 125 and circulate it through a feed pipe 126 to swivel 110 where it flows downward through the drill string interior as indicated by arrow 128. Once the fluid reaches the bit 116, it exits through ports near the cutting elements to entrain and transport rock cuttings upward along the annulus as indicated by arrow 130. The fluid transports the cuttings into the retention pit 125 via return pipe 132. As the drilling mud circulates through the drill bit, the drilling fluids function additionally as a bit coolant and lubrication extending the lifespan of the bit. Ideally, the weight and hydraulic pressure of the drilling fluid flow balances with the formation pressure to minimize fluid loss to the formation while still preventing an uncontrolled release of formation gases and fluids into the borehole, i.e. a "blowout."

Pumps 124 are normally piston-based, causing a significant degree of pressure variation due to the action of the pistons and valves. A pulsation dampener 134 is positioned along the feed pipe 126 to attenuate the (relatively) high-frequency variation, typically with only a moderate degree of success. Downstream of the pulsation dampener, FIG. 1 shows multiple transducers 136 that respond to pressure variation of fluid in the feed pipe 126. The transducers 136 can be directly coupled to the fluid to physically respond to pressure variations, or coupled to a tubular housing the fluid flow to measure dimensional changes resulting from pressure variation in the flow stream. The transducer provides a measurable reference signal (e.g. voltage, current, phase, position, etc.) sensitive to the pressure or temporal derivative thereof, i.e. $dP(t)/dt$, with a response that is proportional to within an understood distortion (e.g., scalar gain, constant phase shift, time-shift, finite precision, etc.).

A transducer interface 138 converts the transducer response into an electrical signal suitable for digitization and processing by receiver 140. Receiver 140 may be dedicated MPT receiver electronics or a general purpose computer with a data acquisition card and suitable software for processing the acquired transducer signal(s). Among other things, receiver 140 may include circuitry, firmware, or software that performs PCA analysis of the acquired signals and employs selected basis vector(s) to extract a telemetry signal. The receiver may be incorporated as part of a computer system or coupled to a computer system that provides a graphical user interface (GUI) to enable a user to view and optionally interactively analyze the telemetry data. The computer may de-multiplex the telemetry data stream to obtain tool-specific logs which can be subjected to individual processing to construct and display the logs in an image format.

To communicate with the surface, a downhole "pulser" induces pressure fluctuations in the flow stream 128. The pressure fluctuations propagate upstream as pressure waves 142 until they reach the transducers 136. Information can be encoded into the pressure waves via modulation such as frequency modulation, phase modulation, pulse position modulation, and pulse width modulation. Other suitable modulation schemes also exist. The chosen modulation scheme preferably provides sufficient detection signal-to-noise ratio despite the attenuation, dispersion, and noise effects introduced into the flow stream 128.

As part of the BHA 106, the down-hole pulser 112 may be mechanically and/or electrically coupled with additional down-hole sensors 114 that measure, calculate and/or sense various conditions within or near the bottom of the borehole being drilled. The BHA may have an electrical power source and inter-communicating control buses that facilitate the transfer of data between BHA components. Not limited to the following, the electrical power source may be batteries and/or generator-based deriving power from the flow of fluids via turbine or like mechanism. Likewise, not limited to the following, said control bus lines may be of a metallic, conductive material for use with electrical systems and/or dielectric material when used with optical sources. FIG. 1 illustrates a single downhole tool sensor coupled with a pulser, but those skilled in the art understand MWD BHA configurations may have a multitude of tools above and/or below a pulser and may utilize more than one communication media, e.g. mud pulse and electromagnetic telemetry.

A downhole controller may be included in the BHA with electronic circuitry that collects from the various sensors measured formation evaluation values such as density of rock formation, pressure of the drilling fluid, and gamma ray readings, and resistivity of rock formation. Additional measurements may include directional information such as but not limited to inclination, tool-face, azimuthal, and/or surveys. The controller may include an encoding module (e.g., in the form of circuitry or a programmable processor executing software in an associated memory device) that encodes the collected information as a data stream for transmission by the pulser 112.

The pulser 112 actuates a valve at least in part to encoding the measurement data stream as pressure modulations of the flow stream. FIG. 2A shows a first illustrative pulser implementation having a valve or variable flow restrictor formed from a circular, fan-like stator 201 having multiple fan blades/fins extending radially from a central hub, and a similarly shaped rotor 202 that can oscillate with respect to the (stationary) stator 201. In this implementation, the valve is said to be closed when the relative alignment of the stator and rotor fins maximally restricts fluid flow (by misaligning the openings between blades). It is said to be open when the relative alignment of the stator and rotor fins minimally restricts fluid flow (by aligning the openings between blades).

The valve is coupled serially within the fluid column to restrict (when closed) or ease (when open) the flow of fluid through the valve towards the drill-bit. When the valve is closed, a pressure build up occurs within the fluid on the source side creating a positive pressure change that propagates up to the surface. A subsequent opening of the valve enables the upstream pressure to drop to its previous pressure. Thus as the rotor 202 oscillates, the valve creates a periodic pressure pulsation that is amenable to frequency and phase modulation.

FIG. 2B shows a second illustrative pulser implementation having a spinning rotor 204 in place of an oscillating rotor 202. As before, the alternation between alignment and misalignment of the openings between the blades produces a periodic pressure pulsation that can be frequency and phase modulated. A spinning rotor may offer better frequency stability at the expense of a more limited modulation range.

FIG. 2C shows a third illustrative pulser implementation having a flow orifice 206 and a poppet 208 that moves relative to the orifice to restrict (when closed) and ease (when opened) the flow of fluid through the valve. A closing and re-opening of the valve (also referred to as a momentary closing of the valve) generates an upgoing pressure pulse ("positive pulse").

FIG. 2D shows a fourth illustrative pulser implementation, which is often termed a "negative pulser". This pulser configuration includes a bypass valve to vent fluid from the drill string bore into the annulus, thereby bypassing the drill bit. This venting of drilling fluid produces a pressure drop (i.e. a negative pressure change) within the drill string's fluid column. FIG. 2D shows a valve seat and gate 210 configuration. The gate 210 moves relative to the seat to close the valve (i.e., restrict fluid flow into the annulus) and open the valve (permit fluid flow into the annulus). After closing the valve, the fluid pressure immediately rises in the drill-string column towards the steady-state pressure prior to the valve's opening of the valve. As the name suggests, this opening and closing actuation of the valve creates a negative pulse that propagates throughout the column of drilling fluid.

In the configurations of FIGS. 2C and 2D, the valve is controllable to generate individual pressure pulses that propagate to the surface, enabling the use of pulse width modulation and pulse position modulation. The modulation (whether frequency, phase, pulse position, pulse width, or some other form of modulation) is handled by the receiver after the pressure variation signals have been acquired via the transducer(s) 136.

Conventional strain gauge sensors may serve as transducers 136 to provide a measurable reference, e.g. 4-20 mA current, proportional to the mechanical fluid pressure present at the coupling point, i.e. $P(t)$, by being directly coupled to the drilling fluid flow. Alternatively, such strain gauges could be employed to measure the strains that the rig's plumbing undergoes when a mud pulse is present and/or absent. Examples of manufacturers of said sensors include but not limited to Honeywell and Rosemount (Emerson Electric affiliated).

Alternatively, as shown in FIG. 1, transducers 136 may respond to the temporal derivative of the pressure signal at each coupling point, i.e., $dP(t)/dt$, or the derivative of a commensurate strain in the plumbing that is proportional to the pressure signal derivative. For the former measurement, direct coupling of the transducer to the fluid flow can be used. For the latter, the transducer can be coupled to the surface of a tubular in the drill rig's plumbing (e.g., feed pipe 126). In the illustrated embodiment, transducers 136 each include an optical fiber winding on the feed pipe to measure the strains via small changes in the feed pipe dimensions.

In a most general sense, there may be different sensor types at different positions within the rig plumbing. A strain-gauge pressure sensor may have a direct connection with the pressurized fluid via a plumbed fitting. Alternatively, fiber optic or strain gauge sensors may be attached to the exterior of the plumbing to sense pressure-induced deformations, or in some cases, the time derivative of such deformations. Ultrasonic flow sensors may be employed to measure pressure-induced velocity variations, flow shear variations, or even density variations. There may be other flow properties and associated sensor types that measure flow properties indicative of MPT signals.

Moreover, at least some disclosed embodiments contemplate coupling one or more sensors at each of a plurality of connection points within drilling rig's plumbing (e.g. standpipe, pumps, manifold, etc.). Unless multiple sensors are at the same exact location, each sensor will see a different waveform with a different viewpoint of the pressure waves. This disparity is partially due to location with respect to dispersive characteristics of the drilling rig's plumbing, but also due to relative location to a noise source (e.g. pumps), and waveform frequency/wavelength-dependent components that may interfere constructively or destructively depending on relative location of significant reflectors and the multi-path effects of such reflectors.

Often, at least one strain gauge sensors is placed on the so-called "standpipe", which is typically the farthest feasible mounting point from the pump noise sources. (The standpipe is a vertical pipe that connects to a flexible high-pressure hose to deliver the fluid flow to the swivel 110.) Strain gauge sensors typically provide a 4-20 mA reference current that after passing through a resistive load may be digitized as a sampled voltage or current measurement. This digitized measurement is proportional to pressure one would see in the standpipe. Other types of sensors that offer great flexibility in location are non-invasive fiber optic sensors that sense minute changes in pipe circumference via phase changes within the light beams traveling within them. Appropriately configured fiber optic sensors yield measurements proportional to the time derivative of pressure within the pipe.

As suggested earlier here within, this circulating column of drilling fluid flowing through the drill string may function as a transmission medium for encoded pressure pulses modulated via a pulser valve's position and/or orientation. These pressure pulses carry MWD information from the BHA to the surface (and sometimes from the surface to the BHA in the case of a "downlink"). In the depicted system embodiment, the pulser and downhole sensors (a.k.a. "downhole tools") are part of a mud pulse telemetry system, and surface systems may monitor sensor outputs sensitive to the temporal differential pressure changes at each coupling point of the sensors and a tubular housing, e.g. the drilling rig's plumbing. Such embodiments may be observe the pressure either directly from the drilling fluid and/or via small pipe diameter changes.

Additionally, the BHA may have an electrical power source and inter-communicating control buses that facilitate the transfer of data between tools and pulser. Not limited to the following, the electrical power source may be batteries and/or generator-based deriving power from the flow of fluids via turbine or like mechanism. Likewise, not limited to the following, said control bus lines may be of a metallic, conductive material for use with electrical systems and/or dielectric material when used with optical sources. FIG. 1 illustrates a single downhole tool sensor coupled with a pulser, but those skilled in the art understand MWD BHA configurations may have a multitude of tools above and/or below a pulser and may utilize more than one communication media, e.g. mud pulse and electromagnetic telemetry.

With this context, then, we turn now to a more detailed discussion of the proposed array processing techniques. Specifically, this disclosure describes and applies Principal Component Analysis (PCA) to a plurality of digitized measurements from a plurality of transducers (sensors) spatially separated along plumbing that transports the fluid flow.

Singular Value Decomposition (SVD) and Eigenvalue Decomposition (ED) are examples extracting principal components that exploit 2nd order statistical similarities/difference (e.g. spatial and/or temporal correlations) between digitized measurements produced by the sensors. At least some receiver embodiments observe the plurality of digitized measurements associated with the pressure waves traveling in the plumbing at a well site and process said measurements to estimate various 1st and 2nd order statistics, (e.g. sample mean, sample variance, sample standard deviation, Auto Regressive (AR) approximation of ergodic and/or spatial means and correlations, Moving Average (MA) sample means and sample covariances within a sliding window related at least in part to the MA order). Other embodiments may approximate the probability density functions (e.g. joint, conditional, marginal) and compute the various expected 1st and $2^{nd}$ order statistics using a processor.

In at least some embodiments, software configures the processor to construct at least one array of statistical estimates within a first memory storage, e.g. a covariance matrix and/or an estimated correlation matrix (this latter may assume the means are zero or have been made zero via a high pass filter, a mean subtraction step, or other mean removal device). These embodiments may further determine at least one feature related to at least one principle component. Some embodiments may further determine a set of principle component vectors that form a basis for a range spanned by the digital measurements. That is, a processor operating from a set of instructions may decompose the covariance/correlation matrices into additional matrices and or vectors. These matrices (and vectors) may include at least one unitary matrix and/or at least one set of singular values stored in memory.

When ordered in rank of importance, the principal components attempt to capture the most variance possible within the observed signal subspace provided by the digitized measurements. When using SVD, this form of signal decomposition may sort the discovered basis vectors in descending order of "interest" using at least in part the magnitude of each basis direction's corresponding singular value. Similarly, other embodiments may follow a similar path of Eigenvalue Decomposition and sort a set eigenvector directions (also an orthonormal basis) according to their corresponding eigenvalues.

Some receiver embodiments may attempt to reduce processing complexity by employing a reduced set of sensors for detection purposes rather than process the entire set of observed digital measurements. Alternatively, or in addition, these embodiments may discard and/or ignore the those principal components that contribute only a minor portion of information. These so-called "minor-components" may correspond to basis components related to singular value magnitudes below some predetermined threshold (e.g. small absolute aggregate value or a percentage of sum of all singular values).

Due to wave dispersion and the finite speed of wave propagation through the flow stream, temporal correlations are also expected between the sensor measurements. To identify and exploit such correlations, the receiver "rakes" the signals relative to each other with varying time shifts to construct 1st and 2nd order sample statistics which as before are subjected to PCA to extract principle components of the time-extended signal subspace.

Before addressing the PCA analysis in great detail, consider FIG. 3 which summarizes an illustrative MPT method. In block 302 the BHA obtains formation measurements and employs them to form a telemetry datastream. The datastream may comply with a communications protocol that, depending on the chosen implementation, includes compression, error correction coding, and framing with synchronization/training headers and checksums. The communications protocol may further provide channel coding and modulation requirements, such as frequency shift keying, phase shift keying, on-off keying, amplitude modulation, pulse width modulation, pulse position modulation, differential encoding, channel pre-coding, and run-length limitations.

In block 304, the pulser modulates the flow stream to generate pressure fluctuations representing the telemetry datastream. The pressure fluctuations propagate along the flow string to the array of sensors.

In block 306, the surface receiver collects measurements from the array of sensors in the rig plumbing. As previously discussed, the sensors may be spatially separated and in some cases may be of different types to measure different flow properties that reflect the pressure fluctuations. The measurements may be digitized and buffered in memory. In some embodiments, the measurements may be stored for later processing.

In block 308, the receiver applies PCA to the measurements to obtain the basis vectors for uncorrelated sources of variation in the measurement set. The measurement set may be expected to have basis vectors associated with the telemetry signal as well as pump noise, pipe vibration modes, and other noise sources. The basis vectors can be determined by post-processing the measurement data, but it may be preferred to perform the PCA in an iterative or adaptive fashion to avoid introducing unwanted delay into the telemetry process. As an alternative approach, a training phase may be employed to initially identify the basis vectors for subsequent use. Such training may be performed during receiver setup or periodically throughout the usage of the receiver.

In block 310, the receiver identifies those one or more basis vectors associated with the telemetry signal, and employs those basis vectors to extract the telemetry signal from the signal set. The identification can be performed in a number of ways, including pattern matching or even just trial and error. For example, telemetry signal may be expected to have a recognizable pattern (particularly if the communications protocol provides for a synchronization/training header), so examination of those signals that result from the application of each basis vector to the set of measurements generally indicates which basis vector(s) extracts the telemetry signal. Also, the success of the subsequent method steps will be contingent on the proper basis vector selection, so the basis vector yielding the lowest error rate or highest estimated detection signal-to-noise ratio may be selected as the appropriate basis vector.

In block 312, the receiver equalizes, demodulates, and decodes the extracted telemetry signal to obtain the telemetry data stream. The equalization compensates for residual signal dispersion, while the demodulation and decoding steps reverse the channel coding and modulation steps, and may further include de-framing, error correction and decompression.

In block 314, the system (either receiver 140 or one of the downstream processing systems) de-multiplexes the data stream to obtain and store data for each of the tools. The extracted log data is then subjected to tool-specific processing to construct logs for display to a user.

We now turn to a more detailed discussion of block 308. Principal Component Analysis (PCA) is a classic statistical data analysis technique. The main idea of PCA is a reduction of dimensionality of a given multi-variate data set from M to K. Using vector representation, let $y=(y_0, y_1, \ldots, y_{M-1})^T$ be a M×1 vector of M observations including a set of at least K interrelated multi-variables, say $u=(u_0, u_1, \ldots, u_{K-1})^T$, where u is a K×1 vector and K≤M. Often the random elements of u cannot be directly observed unobstructed or its dimensionality K even be known a priori. Nevertheless, the goal is then to estimate this smaller set of "features," say û of dimensionality K, from the possibly noise corrupted sampling of y that may statistically represent the K most interesting variables within the M observations, i.e. the principal components with the K largest variances.

This so-called reduction to (or extraction of) "principal" features from within a stochastic process may employ one or more orthogonal (or orthogonal-like) transformations of y to reduce the multi-variable set's dimensionality, i.e. $u=Gy$ where $y \in \mathbb{R}^{M \times 1}$ and $G \in \mathbb{R}^{k \times M}$ whose M columns are pairwise orthogonal. For example, using the well-known dot-product as the inner product, the ith and jth column vectors of G, $g_i$ and $g_j$ respectfully, are said to be pairwise orthogonal if $g_i^T g_j = 0$ if $i <> j$ and $g_i^T g_j = 1$ if and only if $i=j$, $\forall i$. If in addition K=M, then G is said to be an orthogonal transform, and thus, $G^T G = I_{(M \times M)}$ where $I_{(M \times M)}$ is the M×M identity matrix.

Similarly, elements of y may include complex numbers taken from M dimensional complex number space, i.e. $y \in \mathbb{C}^{M \times 1}$ and the orthogonal transform condition becomes $G^H G = I_{(M \times M)}$ where $G^H$ is the conjugate-transpose of G, sometimes called the Hermitian Transpose where $G \in \mathbb{C}^{M \times M}$.

Throughout the remaining disclosure, the author will continue describing the various embodiments of PCA assuming real number elements coming from $\mathbb{R}$-space and will only address complex number space, $\mathbb{C}$-space, when appropriate. It is sufficient to say that these concepts easily extend to observations with complex number elements.

Mathematically, SVD is the matrix factorization of any given (M×N) matrix A. In the event of 1-dimensional real value measurements, we can write the SVD matrix factorization as $$A = U \Sigma V^T$$

where U is the (M×M) left unitary matrix factor, $V^T$ is a (N×N) left unitary matrix factor, and Σ is a diagonal matrix of (M×N) containing singular values on its main diagonal, i.e.

$$UU^T = U^T U = I_{(M \times M)}$$

$$VV^T = V^T V = I_{(N \times N)}$$

$$\Sigma = \text{diag}(\sigma_1, \sigma_2, \ldots, \sigma_{min(M,N)}, 0, \ldots, 0)$$

In embodiments that acquire a 2-dimensional sensor reading (e.g. phase and amplitude, I and Q plane), one can then use the complex value form of SVD, e.g.

$$A = U \Sigma V^H$$

Mathematically, eigenvalue decomposition (ED) is the matrix factorization of a symmetric positive-semi-definite (p.s.d.) (M×M) matrix A. In the event of 1-dimensional real value measurements, we can write the ED matrix factorization as:

$$A = U \Lambda U^T$$

where U is the (M×M) unitary matrix factor having eigenvectors and Λ is a diagonal matrix of (M×M) containing eigenvalues on its main diagonal, i.e.

$$UU^T = U^T U = I_{(M \times M)}$$

$$\Lambda = \text{diag}(\lambda_1, \lambda_2, \ldots, \lambda_M)$$

In embodiments that acquire a 2-dimensional sensor reading (e.g. phase and amplitude, I and Q plane), one can then use the complex value form of ED, e.g.

$$A = U \Lambda U^H$$

ED is essentially a special case of SVD suitable for factoring square p.s.d. matrices. Due to symmetry, ED's complexity is often lower than SVD's complexity when M=N, but due to numerical issues, solutions for SVD are often more stable (i.e. less chance of finite precision issues) and thus used more often.

Turning now to measurements acquired by an array of spaced-apart sensors, let $x[n]=(x[n], x[n-1], \ldots, x[n-N+1])^T$ include N real values, i.e. x[n] is a (N×1) sample vector of the transmitted pressure wave signal as a function of time n. Using a general linear channel model, we can write for real valued output (likewise a similar construction exists for complex valued signals):

$$y[n]=(y_1[n], y_2[n], \ldots, y_{N_{RX}}[n])^T$$

$$y[n]=Hx[n]+\eta[n]$$

$$y[n]=U\Sigma V^T x[n]+\eta[n]$$

where $y_i[n]$ is the ith received sensor measurement at time n, $N_{RX}$ is the number of sensors, and $H=U\Sigma V^T$ is our channel's linear model decomposed.

By left multiplying by an estimate of $U^T$, the processor will attempt to reverse a portion of the effects of the channel, $$U^T y[n]=U^T Hx[n]+U^T \eta[n]$$

$$U^T y[n]=U^T U\Sigma V^T x[n]+\tilde{\eta}[n]$$

$$U^T y[n]=\Sigma V^T x[n]+\tilde{\eta}[n]$$

The left multiply by U rotates the spatial signal space via a unitary transform, i.e. invertible transform so no information loss occurs. Various embodiments estimate U via the SVD and/or ED of a discrete estimate of $R_{yy}(\tau_k)$, namely $\hat{R}_{y,y}[\tau_k]$ using either a Moving Average (MA) or Auto Regressive (AR) process. The right unitary matrix factor $V^T$ can then be readily derived from a measure of the channel response H and used as the basis for extracting transmitted signals.

To estimate $R_{yy}(\tau_k)$ and $\mu_y$, write the continuous and sampled digitized measurements of $N_{RX}$ receivers in vector form $$y(t)=(y_1(t), y_2(t), \ldots, y_{N_{RX}}(t))^T$$

$$y[n]=(y_1[n], y_2[n], \ldots, y_{N_{RX}}[n])^T$$

The expected mean of the $N_{RX}$ received signals can be written in vector form as $$\mu_{yi}=E\{y_i(t)\}$$

$$\mu_y=E\{y(t)\}$$

$$\mu_y=E\{(y_1(t), y_2(t), \ldots, y_{N_{RX}}(t))^T\}$$

$$\mu_y=(E\{y_1(t)\}, E\{y_2(t)\}, \ldots, E\{y_{N_{RX}}(t)\})^T$$

$$\mu_y=(\mu_{y1}, \mu_{y2}, \ldots, \mu_{yN_{RX}})^T$$

along with the covariance matrix $$R_{yi,yj}(\tau_k) = E\{(y_i(t) - \mu_{yi})(y_j(t - \tau_k) - \mu_{yj})^T\}$$

$$R_{y,y}(\tau_k) = E\{(y(t) - \mu_y)(y(t - \tau_k) - \mu_y)^T\}$$

$$= \begin{pmatrix} R_{y_1,y_1}(\tau_k) & R_{y_1,y_2}(\tau_k) & \ldots & R_{y_1,y_{N_{RX}}}(\tau_k) \\ R_{y_2,y_1}(\tau_k) & R_{y_2,y_2}(\tau_k) & \ldots & R_{y_2,y_{N_{RX}}}(\tau_k) \\ \vdots & \vdots & \ddots & \vdots \\ R_{y_{N_{RX}},y_1}(\tau_k) & R_{y_{N_{RX}},y_2}(\tau_k) & \ldots & R_{y_{N_{RX}},y_{N_{RX}}}(\tau_k) \end{pmatrix}$$

Assuming the means are zero or made to be zero by various embodiments, we can write:

$$R_{y,y}(\tau_k)=U\Sigma^2 U^T+R_{\eta,\eta}(\tau_k); \text{ and}$$

$$R_{y,y}(\tau_k)=U\Sigma^2 U^T+\sigma^2 I\delta(\tau_k);$$

if the noise is white. Thus using an estimate of $R_{y,y}(\tau_k)$ may provide an estimate of U and hence $U^T y[n]$.

Moving Average or Auto Regressive approaches may be preferred for sample statistics estimation, but other approaches could also be used.

Averaging over a sliding window of time and computing the so-called Moving Average (MA) estimate is one methods for estimating the various 1st and 2nd order statistics and constructing the mean vectors and covariance/correlation matrices. The MA sample mean vector may be defined as:

$$\hat{\mu}_y^{MA} = \left(\hat{\mu}_{y_1}^{MA}, \hat{\mu}_{y_2}^{MA}, \ldots, \hat{\mu}_{y_{N_{RX}}}^{MA}\right)^T,$$

where the elements are the estimated means of the ith sensor:

$$\hat{\mu}_{y_i}^{MA} = \frac{1}{N_{MA}} \sum_{n=0}^{N_{MA}-1} y_i[n] \text{ where } i = 1, 2, \ldots, N_{RX}$$

Similarly, the MA sample covariance for $\tau_k$ may be defined as:

$$\hat{R}_{y,y}^{MA}[\tau_k] = \begin{pmatrix} \hat{R}_{y_1,y_1}^{MA}[n, \tau_k] & \hat{R}_{y_1,y_2}^{MA}[n, \tau_k] & \ldots & \hat{R}_{y_1,y_{N_{RX}}}^{MA}[n, \tau_k] \\ \hat{R}_{y_2,y_1}^{MA}[n, \tau_k] & \hat{R}_{y_2,y_2}^{MA}[n, \tau_k] & \ldots & \hat{R}_{y_2,y_{N_{RX}}}^{MA}[n, \tau_k] \\ \vdots & \vdots & \ddots & \vdots \\ \hat{R}_{y_{N_{RX}},y_1}^{MA}[n, \tau_k] & \hat{R}_{y_{N_{RX}},y_2}^{MA}[n, \tau_k] & \ldots & \hat{R}_{y_{N_{RX}},y_{N_{RX}}}^{MA}[n, \tau_k] \end{pmatrix}$$

and have its elements estimated linearly by $$\hat{R}_{y_i,y_j}^{MA}[\tau_k] = \frac{1}{N_{MA}} \sum_{n=0}^{N_{MA}-1} (y_i[n] - \hat{\mu}_{y_i}^{MA})(y_j[n - \tau_k] - \hat{\mu}_{y_j}^{MA})^*$$

where $i = 1, 2, \ldots, N_{RX}$ where $\tau_k$ here is an integer relating a sample separation between sensor i and sensor j measurements.

In essence, Auto Regressive (AR) Estimates average over an exponentially decaying window as a function of time to estimate the various 1st and 2nd order statistics and constructing the mean vectors and covariance/correlation matrices. The AR sample mean vector may be defined as:

$$\hat{\mu}_{y_1}^{AR}[n]=\alpha\hat{\mu}_{y_1}^{AR}[n-1]+(1-\alpha)y_i[n] \text{ where } 0<\alpha<1$$

where the elements are $$\hat{\mu}_y^{AR}[n] = \alpha\hat{\mu}_y^{AR}[n-1] + (1-\alpha)y[n] \text{ where } 0 < \alpha < 1$$

$$= \left(\hat{\mu}_{y_1}^{AR}[n], \hat{\mu}_{y_2}^{AR}[n], \ldots, \hat{\mu}_{y_{N_{RX}}}^{AR}[n]\right)^T$$

where n is the current integer time sample and $0<\alpha<1$. The AR sample covariance for $\tau_k$ at time sample n may be defined as:

$$\hat{R}_{y,y}^{AR}[\tau_k] = \begin{pmatrix} \hat{R}_{y_1,y_1}^{AR}[n,\tau_k] & \hat{R}_{y_1,y_2}^{AR}[n,\tau_k] & \cdots & \hat{R}_{y_1,y_{N_{RX}}}^{AR}[n,\tau_k] \\ \hat{R}_{y_2,y_1}^{AR}[n,\tau_k] & \hat{R}_{y_2,y_2}^{AR}[n,\tau_k] & \cdots & \hat{R}_{y_2,y_{N_{RX}}}^{AR}[n,\tau_k] \\ \vdots & \vdots & \ddots & \vdots \\ \hat{R}_{y_{N_{RX}},y_1}^{AR}[n,\tau_k] & \hat{R}_{y_{N_{AR}},y_2}^{AR}[n,\tau_k] & \cdots & \hat{R}_{y_{N_{RX}},y_{N_{RX}}}^{AR}[n,\tau_k] \end{pmatrix}$$

having its elements estimated recursively by $$\hat{R}_{yi,yj}^{AR}[n,\tau_k] = \alpha \hat{R}_{yi,yj}^{AR}[n-1,\tau_k] + (1-\alpha)(y_i[n] - \hat{\mu}_{yi}^{AR})(y_j[n-\tau_k] - \hat{\mu}_{yj}^{AR})^* \text{ where } i=1, 2, \ldots, N_{RX}$$

where $\tau_k$ here is an integer relating a sample count separation between sensor i and sensor j measurements, n is the current integer time sample and $0 < \alpha < 1$.

PCA can be performed with a Temporal-Spatial Tensor Array. Using similar notations, we may describe the received continuous and discrete time temporal-spatial tensor as:

$$\vec{y}(t,\vec{\tau}) = (y_1(t), \ldots, y_{N_{RX}}(t), y_1(t-\tau_1), \ldots, y_{N_{RX}}(t-\tau_1), \ldots, y_1(t-\tau_K), \ldots, y_{N_{RX}}(t-\tau_K))^T$$

$$\vec{y}[t,\vec{\tau}] = (y_1[n], \ldots, y_{N_{RX}}[n], y_1[n-\tau_1], \ldots, y_{N_{RX}}[n-\tau_1], \ldots, y_i[n-\tau_K], \ldots, y_{N_{RX}}[n-\tau_K]))^T$$

where $\vec{\tau} = (\tau_1, \tau_2, \ldots, \tau_{NRX})$. Like the spatial-only case, these temporal-spatial tensor embodiments may estimate the matrix using discrete sampled statistic estimates of $R_{y,y}(\vec{\tau})$ and $\mu_y(\vec{\tau})$ namely $\hat{R}_{y,y}[\vec{\tau}]$ and $\hat{\mu}_y[\vec{\tau}]$, respectively.

As with the spatial-only case, various receiver embodiments may estimate the following mean and vector $$\mu_y(\vec{\tau}) = E\{y(t,\vec{\tau})\}$$

$$R_{y,y}(\vec{\tau}) = E\{(y(t,\vec{\tau}) - \mu_y(\vec{\tau}))(y(t,\vec{\tau}) = \mu_y(\vec{\tau}))^T\}$$

Via MA and AR models in a similar fashion, and estimate a similar U. Thus using an estimate of $R_{y,y}(\vec{\tau})$ various embodiments may estimate U from $R_{y,y}^{MA}(\vec{\tau})$ and/or $R_{y,y}^{AR}(\vec{\tau})$ for a temporal-spatial tensor unitary transform and various embodiments may then use $U^T y[n, \vec{\tau}]$ to extract the principle component features and data from both time and spatially distributed measurements.

Embodiments employing SVD and/or ED may determine a first unitary matrix having orthonormal basis vectors from a plurality of possible unitary matrices (a set) with each matrix in the set having sign permuted basis vectors of the first said determined unitary matrix. In the event that singular values (and/or eigenvalues) corresponding to two or more basis vectors (and/or eigenvectors) are identical, the plurality set may further have unitary matrices that are permutations of columns (and/or rows) unitary matrices in addition to the sign permutation mentioned earlier.

In practice, the drilling conditions and channel conditions may vary temporally. In order to adapt to the new conditions without simultaneously suppressing polarity changes attributable to transmitted data or introducing extraneous polarity changes, at least some embodiments would track any changes in said estimated statistics derived from samplings of said plurality of digitized measurements using any number of estimation techniques (e.g. MA and AR); construct a new array of updated estimated statistics; determine principal components within said plurality of digitized measurements; and detect/decode messages from a pulsing device. These embodiments may further include decomposing said new array of updated estimated statistics using at least in part SVD and/or ED. The basis vectors from consecutive decompositions may be compared and polarity changes applied to the later decomposition to achieve minimized deviation angles between corresponding basis vectors.

Realtime decomposing embodiments may process the current vector sample of digitized measurements and/or any vector sample of digitized measurements thereafter. Additional embodiments may further include buffering/storing any historic digitized measurements and then array process said historic measurements with a decomposition occurring after the historic data in time ("post-processing" or "replay"). Alternatively to determine statistical changes, embodiments may simply decompose updated estimated statistics on a periodic basis. Nevertheless, in either case there may still exist the sign and order ambiguity due to the aforementioned permutations, and the waveform and order of output may permute and/or sign change with each new array decomposition of updated estimated statistics.

In order to address this issue, some embodiments may further include a Graphical User Interface (GUI) wherein said GUI may include a "LOCK" and/or "UNLOCK" control feature. This feature may also be implemented as a physical switch coupled to said processor wherein the physical switch and/or GUI control feature may stop channel statistic tracking and "LOCK" the last determined unitary transform operator for continued use in transforming said digitized measurements after an actuation event of said switch and/or GUI control feature. At least some receiver embodiments may further include an additional control feature for use with graphical displays, a "SIGN" flip GUI control for each transformed digitized measurement waveform displayed on a monitor.

Other embodiments may address the sign flipping and order permuting issue by tracking the pairwise angle between each basis direction pairing of a current unitary matrix decomposition and at least one previous unitary matrix. These embodiments pair current and former basis vectors according to pairwise minimum angles and then sign adjust the basis orientation (positive or negative of a basis vector still describes the same subspace or axis). The complexity of this sign and order tracking grows combinatorially until some basis vector pairings may no longer be practically tracked. In these cases, embodiments may drop the sign and order tracking for the minor components.

One illustrative system employing a surface detection system with a single pressure transducer and a matched filter (without PCA) to receive signals from a negative pulser pulsing at or near 9000 ft measured depth, provided a 62% sample probability of correctly receiving data. Under identical in situ conditions this illustrative system using a surface detection system with four pressure transducers distributed uniformly along the drill rig plumbing between the pumps and the standpipe and spatial PCA-based signal extraction followed by a matched filter, provided a 97% sample probability of correctly receiving data. Calculating data throughput as the product of data rate and probability of correct reception, the PCA-based detection system yielded a 56% improvement in data throughput. Though not quite as positive, other related experiments also yielded favorable results.

Numerous modifications, equivalents, and alternatives will become apparent to those skilled in the art once the above disclosure is fully appreciated. For example, the foregoing description focuses on uplink communication from the BHA to the surface, but this disclosure also applies to downlink communication from the surface to the BHA. Such downlink communications may be used to convey commands and configuration parameters to control tool operations and/or steer the drill string. Some system embodiments may include sensors coupled to noise sources (such as the circulation pumps) to facilitate identification and removal of noise components from the digitized measurements. Examples of such sensors may include vibration sensors, accelerometers, and stroke position monitors. It is intended that the following claims be interpreted to embrace all such modifications, equivalents, and alternatives where applicable.

What is claimed is:

1. A mud pulse telemetry system comprising:
a pulser of a bottom hole assembly (BHA) that transmits a digital data stream as pressure modulations of a flow stream during drilling;
a plurality of spatially separated sensors each responding to pressure modulations of the flow stream; and
a receiver that processes digitized signals from the plurality of sensors to determine a principal component basis vector associated with said pressure modulations from the pulser, wherein the receiver further employs said principal component basis vector to extract the digital data stream.

2. The system of claim 1, wherein the pulser employs one of differential pulse position modulation, phase shift keying, and frequency shift keying, to transmit the digital data stream.

3. The system of claim 1, wherein as part of determining the principal component basis vector, the receiver performs a decomposition of a matrix formed from sampled statistics including at least one of mean, correlation, and covariance.

4. The system of claim 3, wherein the decomposition is an eigenvalue decomposition or a singular value decomposition (SVD).

5. The system of claim 1, wherein as part of determining the principal component basis vector, the receiver performs a decomposition of a temporal-spatial covariance or correlation tensor.

6. The system of claim 1, wherein as part of determining the principal component basis vector, the receiver reduces a mean of the digitized signals.

7. The system of claim 6, wherein as part of determining the principal component basis vector, the receiver normalizes the digitized signals using respective estimated standard deviations.

8. The system of claim 1, further comprising a computer that de-multiplexes the data stream into tool-specific data sets for use in constructing and displaying logs to a user.

9. The system of claim 8, wherein the computer provides a graphical user interface for displaying the logs to a user.

10. The system of claim 9, wherein the graphical user interface enables the user to monitor the decomposition and control polarity of each principal component basis vector.

11. A mud pulse telemetry method that comprises:
acquiring spatially separated measurements that are responsive to pressure fluctuations of a flow stream in a pipe during drilling induced by a downhole pulser of a bottom hole assembly (BHA);
digitizing the measurements;
processing the measurements to determine a principal component basis vector associated with a telemetry signal; and
using the principal component basis vector to extract a digital data stream from the measurements.

12. The method of claim 11, wherein said processing includes:
determining a matrix of sample statistic values; and
determining an eigenvalue decomposition or singular value decomposition of the matrix.

13. The method of claim 12, wherein said matrix is a spatial covariance or spatial correlation matrix.

14. The method of claim 12, wherein said matrix is a temporal-spatial covariance or correlation tensor.

15. The method of claim 12, wherein said processing further includes reducing means of the spatially-separated measurements and normalizing standard deviations of the spatially-separated measurements as part of determining the matrix.

16. The method of claim 12, further comprising repeating said processing to account for changes in the flow stream.

17. The method of claim 16, further comprising monitoring relative polarities between principal component basis vectors obtained with each repetition of the processing step and inverting basis vector polarities as needed to maintain consistent polarity of at least some basis vectors.

18. The method of claim 11, wherein said extracting a digital data stream includes applying the basis vector to the measurements to obtain a telemetry signal, and further includes demodulating the telemetry signal to obtain the digital data stream.

19. The method of claim 18, wherein the telemetry signal represents the digital data stream with one of pulse position modulation, phase shift keying, and frequency shift keying.

20. The method of claim 11, further comprising deriving one or more borehole logs from the digital data stream and displaying said logs.

* * * * *

UNITED STATES PATENT AND TRADEMARK OFFICE
CERTIFICATE OF CORRECTION

PATENT NO. : 10,174,611 B2
APPLICATION NO. : 14/422319
DATED : January 8, 2019
INVENTOR(S) : Victor J. Stolpman Page 1 of 1

It is certified that error appears in the above-identified patent and that said Letters Patent is hereby corrected as shown below:

In the Specification

Column 3, Lines 16-17, delete "l2-norm. Other common norms may be the l1-norm and (for discrete measurements) the l∞-norm." and insert --$\ell$2-norm. Other common norms may be the $\ell$1-norm and (for discrete measurements) the $\ell\infty$-norm.--

Column 10, Line 20, delete "$\mathbf{A} = \mathbf{\Sigma V}^T$" and insert --$\mathbf{A} = \mathbf{U\Sigma V}^T$--

Column 10, Line 26, delete "$\mathbf{UU}^T = \mathbf{U}^{TU} = \mathbf{I}_{(M \times M)}$" and insert --$\mathbf{UU}^T = \mathbf{U}^T\mathbf{U} = \mathbf{I}_{(M \times M)}$--

Column 11, Line 23 approximately, after --namely-- delete "$\hat{R}_{y,t}[\tau_k]$" and insert --$\hat{R}_{y,y}[\tau_k]$--

Column 13, Lines 25-26, delete
"$y[t,\vec{\tau}] = (y_1[n], \ldots, y_{N_{RX}}[n], y_1[n-\tau_1], \ldots, y_{N_{RX}}[t-\tau_1], \ldots, y_1[n-\tau_K], \ldots, y_{N_{RX}}[n-\tau_K]))^T$" and insert
--$y[n,\vec{\tau}] = (y_1[n], \ldots, y_{N_{RX}}[n], y_1[n-\tau_1], \ldots, y_{N_{RX}}[n-\tau_1], \ldots, y_1[n-\tau_K], \ldots, y_{N_{RX}}[n-\tau_K]))^T$--

Signed and Sealed this
Twenty-third Day of July, 2019

Andrei Iancu
*Director of the United States Patent and Trademark Office*